US006487506B1

(12) United States Patent
Schoch

(10) Patent No.: US 6,487,506 B1
(45) Date of Patent: Nov. 26, 2002

(54) THRU-STROKE TIPPING MOMENT SEVERITY MONITOR

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/579,797

(22) Filed: May 26, 2000

Related U.S. Application Data

(60) Provisional application No. 60/159,716, filed on Oct. 15, 1999.

(51) Int. Cl.[7] .................................................. G01B 3/52

(52) U.S. Cl. ............................................ 702/34; 702/33

(58) Field of Search ................................ 364/475, 474, 364/551, 551.02, 552, 511; 700/174, 206; 702/34

(56) References Cited

U.S. PATENT DOCUMENTS

| | | | | | |
|---|---|---|---|---|---|
| 3,161,044 | A | | 12/1964 | Harrison et al. | |
| 4,023,044 | A | | 5/1977 | Miller et al. | |
| 4,088,899 | A | | 5/1978 | Miller et al. | |
| 4,176,396 | A | * | 11/1979 | Howatt | 364/551 |
| RE30,298 | E | | 6/1980 | Keller | |
| 4,351,029 | A | * | 9/1982 | Maxey et al. | 364/511 |
| 4,442,494 | A | * | 4/1984 | Fromson et al. | 364/511 |
| 4,453,421 | A | | 6/1984 | Umano | |
| 4,458,514 | A | | 7/1984 | Bathory | |
| 4,471,444 | A | * | 9/1984 | Yee et al. | 364/475 |
| 4,559,600 | A | * | 12/1985 | Rao | 364/474 |
| 4,633,720 | A | | 1/1987 | Dybel et al. | |
| 4,692,857 | A | | 9/1987 | Chi | |
| 4,707,796 | A | * | 11/1987 | Calabro et al. | 364/552 |
| 4,750,131 | A | | 6/1988 | Martinez | |
| 4,766,758 | A | | 8/1988 | Lucas et al. | |
| 4,939,665 | A | | 7/1990 | Gold et al. | |
| 4,987,528 | A | | 1/1991 | O'Brien | |
| 5,119,311 | A | | 6/1992 | Gold et al. | |
| 5,253,572 | A | | 10/1993 | Uehara et al. | |
| 5,379,688 | A | | 1/1995 | Ishii | |
| 5,428,556 | A | * | 6/1995 | Torizawa et al. | 364/551.02 |
| 5,491,647 | A | | 2/1996 | O'Brien et al. | |
| 5,587,931 | A | * | 12/1996 | Jones et al. | 364/551.02 |
| 6,021,360 | A | * | 2/2000 | Barker et al. | 700/174 |
| 6,122,565 | A | * | 9/2000 | Wenning et al. | 700/206 |
| 6,308,138 | B1 | * | 10/2001 | Jones et al. | 702/34 |

OTHER PUBLICATIONS

Huamin Liu; Makis, V; "Cutting Tool Reliability Assessment in Variable Machining Conditions"; IEEE Transactions on Reliability; vol. 45 Issue 4; Dec. 1996; pp. 573–581.*

Nicol, D M; Palumbo, D L; Ulrey, M L; "A Graphical Model–Based Reliability Estimation Tool And Failure Mode & Effects Simulator"; Annual Proceedings Relaibility and Maintainability Symposium; 1995; pp 74–81.*

* cited by examiner

*Primary Examiner*—John S. Hilten
*Assistant Examiner*—Douglas N Washburn
(74) *Attorney, Agent, or Firm*—Randall J. Knuth

(57) ABSTRACT

An apparatus and method for monitoring the tipping moment severity of a mechanical press for the purpose of accurately predicting die reliability. The method includes generating a unique tipping moment severity chart for the press application to be monitored and continually monitoring the tipping moment level during production operation of the press. Apparatus is used to monitor the applied load which is communicated to a computational device for computing and plotting tipping moment severity on the tipping moment severity chart.

25 Claims, 3 Drawing Sheets

THRU-STROKE TIPPING MOMENT SEVERITY MONITOR

This application claims the benefit of No. 60/159,716 filed Oct. 15, 1999

BACKGROUND OF THE INVENTION

1. Field of the Invention

The present invention relates generally to press tipping moment monitoring and, more particularly, to a method of generating a tipping moment severity chart for the determination of die long-term operating reliability during production operation and to an apparatus utilizing the information generated by the above method in monitoring press tipping moment severity and die life risk condition based upon tipping moment severity so that die reliability may be determined.

2. Description of the Related Art

Conventional press machines employ a tooling apparatus in the form of a die assembly to shape a workpiece, such as in a stamping or drawing operation. The die assembly particularly includes a lower die attached to a non-moveable bed or bolster and an upper die or punch attached to a reciprocating slide. The upper and lower dies, which are installed in opposing spaced apart relation to one another, cooperate during press machine operation to mutually engage the workpiece at respective sides thereof to thereby effect the desired forming activity.

Repeated stamping operations of a mechanical press cause die wear. The ability to accurately predict die wear or to predict operating conditions which indicate the propensity for increased die wear is advantageous in that press down time for die replacement or reconditioning can be predicted or even potentially diverted by proactive early corrective intervention. The ability to predict die wear allows the operator of a mechanical press to better plan times for die replacement or to intervene with corrective actions, so that productivity loss is not experienced. Further, the ability to predict die wear is advantageous in that press down time associated with die maintenance can be minimized. The desire to predict die wear has led press users to monitor press load and to use this monitored load as a loosely related predictor of potential die wear.

The ability to predict die wear based upon applied load does not provide an accurate indication of die wear. To accurately predict die wear, tipping moment severity also must be accounted for. Currently, a press user cannot accurately predict die wear so that losses in productivity due to excessive or insufficient die maintenance can be avoided. Additionally, load sensors of the current die wear predictive systems do not account for die chipping due to tipping moments. Die chipping due to tipping moments in a mechanical press leads to inferior production quality and associated production losses.

SUMMARY OF THE INVENTION

The present invention is directed to improve upon the aforementioned mechanical press die wear predictive systems wherein it is desired to monitor the tipping moment of any specific press/die application while it is operating to accurately predict die wear and to avoid die chipping due to tipping moments.

The present invention provides a method and apparatus for predicting conditions creating increased die wear which is developed by tipping moments experienced in the mechanical press.

The invention, in one form thereof, comprises a load sensor attached to the bed of a running press and a computational device for receiving the load value from the load sensor and computing a measure of tipping moment severity of the running press based upon the sensed load value and methods for computing moments. The computational device can be, for example, a microprocessor.

The invention, in another form thereof, includes one or more load sensors attached to the bed of a running press and a computational device which stores a unique tipping moment severity chart for the running press, a plurality of tipping moment severity factors which correspond to zones of tipping moment severity on the tipping moment severity chart and a plurality of zone of criticality factors which correspond to the zones of criticality on the tipping moment severity chart. The computational device receives the load values sensed from the load sensors and uses means to compute tipping moments based upon the sensed load values.

The invention, in another form thereof, includes one or more load sensors attached to the bed of a running press and a computational device which stores a unique tipping moment severity chart for the running press, a plurality of tipping moment severity factors which correspond to zones of tipping moment severity on the tipping moment severity chart and a plurality of zone of criticality factors which correspond to the zones of criticality on the tipping moment severity chart. The computational device receives the load values sensed from the load sensors and uses means to compute tipping moments based upon the sensed load values. The computational device also utilizes the tipping moment severity chart, the tipping moment severity factors, the zone of criticality factors, and the measured tipping moment to compute a measure of die life risk condition.

The invention, in another form thereof, includes one or more load sensors attached to the bed of a running press and a computational device which stores a unique tipping moment severity chart for the running press, a plurality of tipping moment severity factors which correspond to zones of tipping moment severity on the tipping moment severity chart and a plurality of zone of criticality factors which correspond to the zones of criticality on the tipping moment severity chart. The computational device receives the load values sensed from the load sensors and uses means to compute tipping moments based upon the sensed load values. The computational device utilizes the tipping moment severity chart, the tipping moment severity factors, the zone of criticality factors, and the measured tipping moment to compute a measure of die life risk condition. The values computed in the computational device, including tipping moment severity and die life risk condition may be communicated to, for example, a digital storage device, a modem, a display device, an alert device or a shutoff device. The digital storage device may be utilized for compiling histories of tipping moment severity and die life risk condition. A modem or other communication network such as the Internet may be used for communicating tipping moment severity and/or die life risk condition to a remote location. The display device may display tipping moment and/or die life risk condition so that service, maintenance, or production personnel may determine how changing press speed, shut height and die changes can alter the expected life span of the die and punch set. The alert device and the shutoff device will produce an alert signal and discontinue press operation, respectively, if the tipping moment severity and/or die life risk condition exceeds a predetermined measure.

The invention, in another form thereof, comprises a method of monitoring the die reliability condition of a running press by monitoring the tipping moment severity of the running press.

The invention, in another form thereof, comprises a method of monitoring the die reliability condition of a running press which includes: placing at least one load sensor on the bed of a running press, providing a computational device, communicating the load sensed by the load sensor to the computational device, and computing the tipping moment severity of the press using the sensed load value.

The invention, in another form thereof, comprises a method of computing a unique tipping moment severity chart for a particular press and die set. This method includes the steps of: dividing the ordinate of a tipping moment severity versus slide vertical position graph into a plurality of zones which zones represent different tipping moment severity levels, plotting the slide vertical motion on the tipping moment severity chart, dividing the ordinate of the tipping moment severity versus slide vertical position graph into a plurality of zones of criticality representing different phases of punch travel, projecting the zones of criticality onto the plot of slide vertical motion and projecting the zones of criticality from the plot of slide vertical motion to the abscissa of the tipping moment severity versus slide vertical position graph.

The invention, in another form thereof, comprises a method of generating a unique tipping moment severity chart for a particular press and die set. This method includes the steps of: dividing the ordinate of a tipping moment severity versus slide vertical position graph into a plurality of zones which zones represent different tipping moment severity levels; plotting the slide vertical motion on the tipping moment severity chart; dividing the ordinate of the tipping moment severity versus slide vertical position graph into three zones of criticality which represent free punch travel, punch travel through the stock material and punch travel through the die; projecting the zones of criticality onto the plot of slide vertical motion and projecting the zones of criticality from the plot of slide vertical motion to the abscissa of the tipping moment severity versus slide vertical position graph.

The invention, in another form thereof, comprises a method of generating a unique tipping moment severity chart for a particular press and die set. This method includes the steps of: dividing the positive portion of the ordinate of a tipping moment severity versus slide vertical position graph into four zones of tipping moment severity, dividing the negative portion of the ordinate of a tipping moment severity versus slide vertical position graph into four zones of tipping moment severity, plotting the slide vertical motion on the tipping moment severity chart, dividing the ordinate of the tipping moment severity versus slide vertical position graph into a plurality of zones of criticality which represent different phases of punch travel, projecting the zones of criticality onto the plot of slide vertical motion and projecting the zones of criticality from the plot of slide vertical motion to the abscissa of versus tipping moment severity versus the slide vertical position graph.

The invention, in another form thereof, comprises a method of monitoring the die life risk condition of a mechanical press. This method includes the steps of: monitoring the tipping moment severity of the press application, generating a unique tipping moment severity chart for the press application, plotting the monitored tipping moment severity of the press on the unique tipping moment severity chart for the press and computing the die life risk condition of the press.

The invention, in another form thereof, comprises a method of monitoring the die life risk condition of a mechanical press. This method includes the steps of: monitoring the tipping moment severity of the press; generating a unique tipping moment severity chart for the press; plotting the monitored tipping moment severity of the press on the unique tipping moment severity chart for the press; determining the duration of the positive peak tipping moment severity level; determining the duration of the negative peak tipping moment severity level; determining the tipping moment severity factor associated with the positive peak tipping moment severity level; determining the tipping moment severity factor associated with the negative peak tipping moment severity level; determining the zone of criticality factor associated with the positive peak tipping moment severity level; determining the zone of criticality factor associated with the negative peak tipping moment severity level; computing a die life risk condition component value associated with the positive peak tipping moment severity level using the duration of the positive peak tipping moment severity, the tipping moment severity factor associated with the positive peak tipping moment severity and the zone of criticality factor associated with the positive peak tipping moment severity level; computing a die life risk condition component value associated with the negative peak tipping moment severity level using the duration of the negative peak tipping moment severity, the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

The invention, in another form thereof, comprises a method of monitoring the die life risk condition of a mechanical press. This method includes the steps of: monitoring the tipping moment severity of the press; generating a unique tipping moment severity chart for the press; plotting the monitored tipping moment severity of the press on the unique tipping moment severity chart for the press; determining the duration of the positive peak tipping moment severity level; determining the duration of the negative peak tipping moment severity level; determining the tipping moment severity factor associated with the positive peak tipping moment severity level; determining the tipping moment severity factor associated with the negative peak tipping moment severity level; determining the zone of criticality factor associated with the positive peak tipping moment severity level; determining the zone of criticality factor associated with the negative peak tipping moment severity level; computing a die life risk condition component value associated with the positive peak tipping moment severity level using the positive peak tipping moment severity, the duration of the positive peak tipping moment severity, the tipping moment severity factor associated with the positive peak tipping moment severity and the zone of criticality factor associated with the positive peak tipping moment severity level; computing a die life risk condition component value associated with the negative peak tipping moment severity level using the negative peak tipping moment severity, the duration of the negative peak tipping moment severity, the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

The invention, in another form thereof, comprises a method of monitoring the die life risk condition of a mechanical press. This method includes the steps of: monitoring the tipping moment severity of the press, generating a unique tipping moment severity chart versus zone of criticality for the press, plotting the monitored tipping moment severity of the press on the unique tipping moment severity chart for the press, determining the tipping moment severity factor associated with the positive peak tipping moment severity level, determining the tipping moment severity factor associated with the negative peak tipping moment severity level, determining the zone of criticality factor associated with the positive peak tipping moment severity level, determining the zone of criticality factor associated with the negative peak tipping moment severity level, computing a die life risk condition component value associated with the positive peak tipping moment severity level using the tipping moment severity factor associated with the positive peak tipping moment severity level and the zone of criticality factor associated with the positive peak tipping moment severity level, computing a die life risk condition component value associated with the negative peak tipping moment severity level using the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

The invention, in another form thereof, comprises a method of monitoring the die life risk condition of a mechanical press. This method includes the steps of: monitoring the tipping moment severity of the press; generating a unique tipping moment severity chart for the press; plotting the monitored tipping moment severity of the press on the unique tipping moment severity chart for the press; associating the monitored tipping moment severity with the appropriate zone of criticality factor; computing the absolute value of the monitored tipping moment severity; computing a weighted tipping moment severity value using the absolute value of the monitored tipping moment severity and the zone of criticality factor associated with the monitored tipping moment severity; recording weighted tipping moment severity values versus time; and generating a cumulative tipping moment severity value for one slide stroke using the weighted tipping moment severity values versus time.

The invention, in another form thereof, comprises a method of monitoring the die life risk condition of a mechanical press. This method includes the steps of: monitoring the tipping moment severity of the press; generating a unique tipping moment severity chart for the press; plotting the monitored tipping moment severity of the press on the unique tipping moment severity chart for the press; associating the monitored tipping moment severity with the appropriate zone of criticality factor; computing the absolute value of the monitored tipping moment severity; computing a weighted tipping moment severity value using the absolute value of the monitored tipping moment severity, and the zone of criticality factor associated with the monitored tipping moment severity; recording weighted tipping moment severity values versus time; and generating a cumulative tipping moment severity value for one slide stroke using the weighted tipping moment severity values versus time. Multiple peaks of tipping moment severity are accounted for when utilizing measures of die life risk condition based upon cumulative tipping moment severity for a slide stroke.

An advantage of the present invention is that constant monitoring of the tipping moment severity of a press allows the tool design to be changed to reduce tipping moments and to increase the parallelism of the press thereby increasing the produced part quality.

Another advantage of the present invention is that the propensity for increased die wear may be accurately predicted so that press down time for die replacement or reconditioning can be predicted and die replacement or reconditioning can be planned so that lost productivity is not experienced.

Another advantage of the present invention is that die wear may be accurately predicted so that losses in productivity due to excessive or insufficient die maintenance can be avoided.

A further advantage of the present invention is that by monitoring tipping moment severity, die chipping due to tipping moments in a mechanical press can be eliminated or greatly improved so that the inferior production quality and the associated productivity losses due to die chipping can be eliminated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
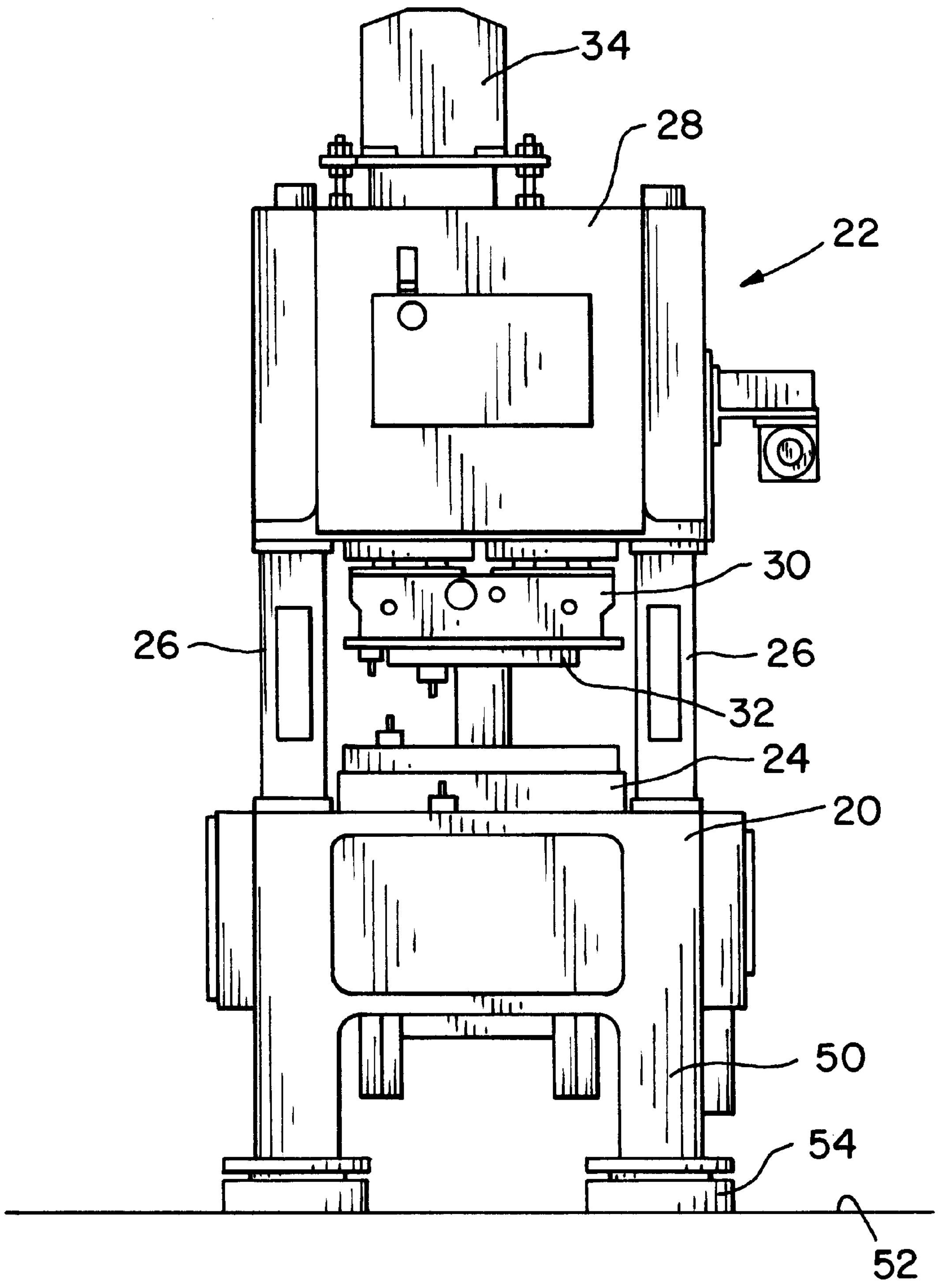
FIG. 2 is an elevational view of a typical press which is the subject of tipping moment monitoring.

Referring now to the drawings and particularly to FIG. 2, there is depicted a typical press 22 having a bed 20 with a bolster 24. Attached vertically to the bed 20 are uprights 26 which support a crown 28. Above crown 28 and attached thereto there is press motor 34. A slide 30 is operatively connected so that during operation press motor 34 causes slide 30 to reciprocate in rectilinear fashion toward and away from the bed 20. Tooling 32 is operatively connected to slide 30. Leg members 50 are formed as an extension of bed 20 and are generally mounted to the shop floor 52 by means of shock absorbing pads 54.

Figure 1:
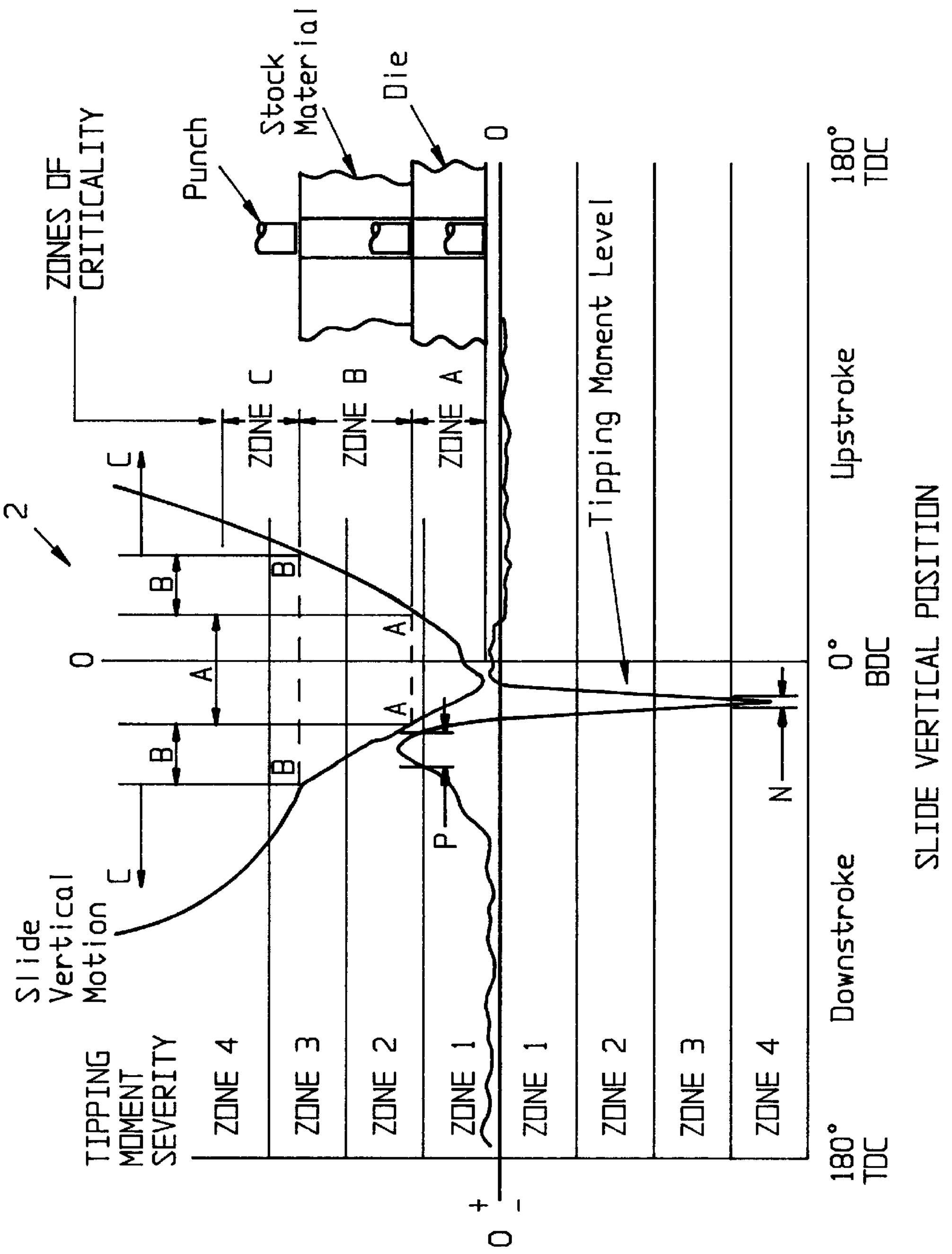
FIG. 1 depicts an empirically generated press tipping moment severity chart according to the present invention.

Referring to FIG. 1, there is shown a tipping moment severity chart 2 generated by the method of the present invention, which is specific to a particular press and die set and which is utilized to determine the operating reliability of the die set. The tipping moment severity chart 2 is a tipping moment severity versus slide vertical position graph. The positive and negative portions of the ordinate of this graph are both divided into four zones of tipping moment severity. Tipping moment severity factors are then associated with these plotted zones of tipping moment severity. The ordinate of the tipping moment severity chart 2 is divided into three or four or five zones of criticality which represent free punch travel, punch travel through the stock material and punch travel through the die. A graphical representation of slide vertical motion is plotted on the tipping moment severity chart 2. The zones of criticality are projected onto the graphical representation of slide vertical motion so that the zones may then be projected onto the abscissa of the tipping moment severity chart 2. One or more load sensors 10 (FIG. 3) are attached to one or more locations on the bed 20 (FIG. 2) of the mechanical press. Load sensors 10 continually communicate sensed load values to computational device 12. Computational device 12 uses these values to compute tipping moment values which are then plotted on the tipping moment severity chart 2.

Figure 3:
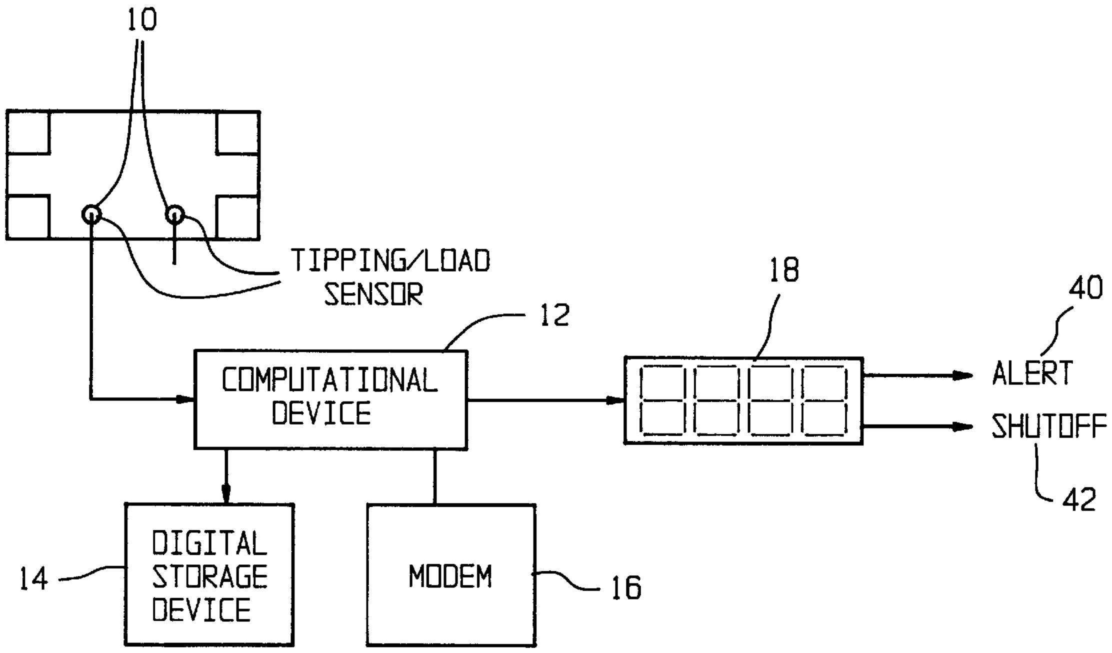
FIG. 3 is a schematic representation of an embodiment of the tipping moment monitoring apparatus.

FIG. 3 illustrates one embodiment of the invention wherein a computational device 12 stores the tipping moment severity chart 2 for the particular press being monitored and receives sensed load values from load sensors 10. Computational device 12 is communicatively connected to digital storage device 14, modem 16, display 18, press alert signal 40, and press shutoff signal 42.

During press operation, load sensors 10 continually monitor and communicate load values to computational device 12. Computational device 12 receives load values from load sensors 10 and therefrom computes tipping moment severity. Computational device 12 stores the tipping moment severity chart for the press being monitored and continually plots tipping moment level on the tipping moment severity chart. Computational device 12 stores tipping moment severity factors associated with the tipping moment severity zones which form a part of the tipping moment severity chart 2. Computational device 12 also stores zones of criticality factors which correspond to slide displacement and are associated with the zones of criticality which form a part of the tipping moment severity chart 2. Utilizing these factors and monitored tipping moment severity, computational device 12 computes a measure of die life risk condition which may be transmitted to digital storage device 14, modem 16, and/or display unit 18.

In one preferred embodiment, computational device 12 computes a measure of die life risk condition by determining the duration of the positive peak tipping moment P (FIG. 1), the duration of the negative peak tipping moment N (FIG. 1) and the tipping moment severity factor and zone of criticality factor which is associated with the positive peak tipping moment and the negative peak tipping moment. The duration of the positive peak tipping moment is multiplied by the appropriate tipping moment severity factor and zone of criticality factor, the duration of the negative tipping moment is multiplied by the appropriate tipping moment severity factor and zone of criticality factor, and these two values are summed to determine a die life risk condition.

Computational device 12 may compute different measures of die life risk condition including the following measures of die life risk condition. Alternate method 1: the positive peak tipping moment severity is multiplied by the duration of the positive peak tipping moment, the appropriate tipping moment severity factor and the appropriate zone of criticality factor; the absolute value of the negative peak tipping moment severity is multiplied by the duration of the negative peak tipping moment, the appropriate tipping moment severity factor and the appropriate zone of criticality factor; and these two values are summed to determine a die life risk condition. Alternate method 2: the tipping moment severity factor associated with the positive peak tipping moment is multiplied by the zone of criticality factor associated with the positive peak tipping moment, the tipping moment severity factor associated with the negative peak tipping moment severity is multiplied by the zone of criticality factor associated with the negative peak tipping moment, and these two values are summed to determine a die life risk condition. Alternate method 3: monitored tipping moment is associated with the appropriate zone of criticality factor, the absolute value of the monitored tipping moment is then multiplied by the appropriate zone of criticality factor and this value is plotted as a function of slide vertical position, and the area under this curve is computed to determine a value of die life risk condition. Alternate method 4: the monitored tipping moment severity is associated with the appropriate tipping moment severity factor and zone of criticality factor, the absolute value of the monitored tipping moment severity is multiplied by the appropriate tipping moment severity factor and zone of criticality factor. This value is plotted as a function of slide vertical position, the area under this graph is computed and determines a value of die life risk condition.

Computational device 12 may also communicate tipping moment severity levels to digital storage device 14, modem 16 and display unit 18. Tipping moment severity and die life risk condition values may further by communicated to a press alert signal 40 or a press shutoff signal 42.

During press operation, display 18 is visually checked by the operator or production manager to determine whether the tipping moment severity or associated die life risk condition is acceptable. Alert signal 40 may be connected to a visual or audible alarm to warn the operator when the tipping moment severity and/or the die life risk condition of the press 22 has reached a predetermined level. Press shutoff signal 42 may be used to shutoff press 22 when the tipping moment severity and/or the die life risk condition of the press 22 reaches a predetermined level.

Digital storage device 14 stores historical data for the press being monitored so that die maintenance may be accurately predicted. Additionally, modem 16 may communicate tipping moment severity and die life risk condition to a remote location where die maintenance and replacement may be scheduled.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for monitoring the die reliability condition of a running press, the running press having a bed, said apparatus comprising:

at least one load sensor for sensing a load value, said at least one load sensor attached to the bed of the running press; and a computational device for computing a plurality of computed values, said device storing a plurality of data relating to the running press and receiving the load value from said at least one load sensor, wherein one of said plurality of computed values is a measure of the tipping moment severity of the running press based on said sensed load value from said at least one load sensor, said computational device communicatively connected to said at least one load sensor.

2. The apparatus as recited in claim 1, wherein said computational device comprises:

a microprocessor.

3. The apparatus as recited in claim 1, wherein said plurality of data stored in said computational unit comprises:

a unique tipping moment severity chart for the running press;

a plurality of tipping moment severity factors corresponding to a plurality of zones representing differing tipping moment severity levels which form a part of said tipping moment severity chart; and a plurality of zone of criticality factors corresponding to a plurality of zones of criticality which form a part of said tipping moment severity chart.

4. The apparatus as recited in claim 2, wherein one of said plurality of computed values computed by said computational device is a measure of die life risk condition.

5. The apparatus as recited in claim 1, further comprising:

a digital storage device for storing at least one of said plurality of computed values, said digital storage device communicatively connected to said computational device.

6. The apparatus as recited in claim 1, further comprising:

a modem for communicating at least one of said plurality of computed values to a remote location, said modem communicatively connected to said computational device.

7. The apparatus as recited in claim 1, further comprising:

a display device for displaying at least one of said plurality of computed values, said display device communicatively connected to said computational device.

8. The apparatus as recited in claim 1, further comprising:

an alert device for producing an alert signal if at least one of said plurality of computed values exceeds a predetermined measure, said alert device communicatively connected to said computational device.

9. The apparatus as recited in claim 1, further comprising:

a shutoff device for discontinuing press operation if at least one of said plurality of computed values exceeds a predetermined measure, said shutoff device communicatively connected to said computational device.

10. A method of monitoring the die reliability condition of a running press, the running press having a bed, said method comprising:

monitoring the tipping moment severity of the running press.

11. The method of claim 10, wherein said step of monitoring the tipping moment severity of the press comprises:

placing at least one load sensor on the bed of the running press;

providing a computational device;

communicating the load sensed by the load sensor to the computational device; and computing the tipping moment severity of the press using the sensed load value.

12. A method of generating, for a particular press and die set, a unique tipping moment severity chart, comprising:

dividing the ordinate of a tipping moment severity versus slide vertical position graph into a plurality of zones representing differing tipping moment severity levels;

plotting the slide vertical motion on said tipping moment severity chart;

dividing the ordinate of the tipping moment severity versus slide vertical position graph into a plurality of zones of criticality representing differing phases of punch travel;

projecting the zones of criticality onto the plot of slide vertical motion; and projecting the zones of criticality from the plot of slide vertical motion to the abscissa.

13. The method of claim 12, wherein said step of dividing the ordinate into a plurality of zones of criticality further comprises:

defining three zones of criticality which represent free punch travel, load development delay on material upper surface punch travel through the stock material and punch travel through the die.

14. The method of claim 12, wherein said step of dividing the ordinate into a plurality of zones representing differing tipping moment severity levels further comprises:

defining four zones of tipping moment severity on the positive portion of the ordinate; and defining four zones of tipping moment severity on the negative portion of the ordinate.

15. A method of monitoring the die life risk condition of a mechanical press comprising:

monitoring the tipping moment severity of the press;

generating a unique tipping moment severity chart for the press;

plotting the monitored tipping moment severity of the press on the unique tipping moment severity chart for the press;

providing a computational device; and computing the die life risk condition of the press.

16. The method of claim 15, wherein said step of generating a unique tipping moment severity chart for the press further comprises:

dividing the ordinate of a tipping moment severity versus slide vertical position graph into a plurality of zones representing differing tipping moment severity levels;

plotting slide vertical motion on said tipping moment severity chart;

dividing the ordinate of the tipping moment severity versus slide vertical position graph into a plurality of zones of criticality representing differing phases of punch travel;

projecting the zones of criticality onto the plot of slide vertical motion; and projecting the zones of criticality from the plot of slide vertical motion to the abscissa.

17. The method of claim 16, wherein said step of generating a unique tipping moment severity chart for the press further comprises:

determining a plurality of tipping moment severity factors corresponding to the plurality of zones representing differing tipping moment severity levels; and determining a plurality of zone of criticality factors corresponding to the plurality of zones of criticality which correspond to differing phases of punch travel.

18. The method of claim 17, wherein said step of computing the die life risk condition of the press further comprises:

determining the duration of the positive peak tipping moment severity level;

determining the duration of the negative peak tipping moment severity level;

determining the tipping moment severity factor associated with the positive peak tipping moment severity level;

determining the tipping moment severity factor associated with the negative peak tipping moment severity level;

determining the zone of criticality factor associated with the positive peak tipping moment severity level;

determining the zone of criticality factor associated with the negative peak tipping moment severity level;

computing a die life risk condition component value associated with the positive peak tipping moment severity level using the duration of the positive peak tipping moment severity, the tipping moment severity factor associated with the positive peak tipping moment severity and the zone of criticality factor associated with the positive peak tipping moment severity level;

computing a die life risk condition component value associated with the negative peak tipping moment severity level using the duration of the negative peak tipping moment severity, the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

19. The method of claim 17, wherein said step of computing the die life risk condition of the press further comprises:

determining the duration of the positive peak tipping moment severity level;

determining the duration of the negative peak tipping moment severity level;

determining the tipping moment severity factor associated with the positive peak tipping moment severity level;

determining the tipping moment severity factor associated with the negative peak tipping moment severity level;

determining the zone of criticality factor associated with the positive peak tipping moment severity level;

determining the zone of criticality factor associated with the negative peak tipping moment severity level;

computing a die life risk condition component value associated with the positive peak tipping moment severity level using the positive peak tipping moment severity, the duration of the positive peak tipping moment severity, the tipping moment severity factor associated with the positive peak tipping moment severity and the zone of criticality factor associated with the positive peak tipping moment severity level;

computing a die life risk condition component value associated with the negative peak tipping moment severity level using the negative peak tipping moment severity, the duration of the negative peak tipping moment severity, the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

20. The method of claim 17, wherein said step of computing the die life risk condition of the press further comprises:

determining the tipping moment severity factor associated with the positive peak tipping moment severity level;

determining the tipping moment severity factor associated with the negative peak tipping moment severity level;

determining the zone of criticality factor associated with the positive peak tipping moment severity level;

determining the zone of criticality factor associated with the negative peak tipping moment severity level;

computing a die life risk condition component value associated with the positive peak tipping moment severity level using the tipping moment severity factor associated with the positive peak tipping moment severity and the zone of criticality factor associated with the positive peak tipping moment severity level;

computing a die life risk condition component value associated with the negative peak tipping moment severity level using the tipping moment severity factor associated with the negative peak tipping moment severity and the zone of criticality factor associated with the negative peak tipping moment severity level; and computing a die life risk condition of the press by summing the die life risk condition component value associated with the positive peak tipping moment severity level and the die life risk condition component value associated with the negative peak tipping moment severity level.

21. The method of claim 17, wherein said step of computing the die life risk condition of the press further comprises:

associating the monitored tipping moment severity with the appropriate zone of criticality factor;

computing the absolute value of the monitored tipping moment severity;

computing a weighted tipping moment severity value using the absolute value of the monitored tipping moment severity and the zone of criticality factor associated with the monitored tipping moment severity;

recording weighted tipping moment severity values versus time; and generating a cumulative tipping moment severity value for one slide stroke using the weighted tipping moment values versus time.

22. The method of claim 17, wherein said step of computing the die life risk condition of the press further comprises:

associating the monitored tipping moment severity with the appropriate tipping moment severity factor;

associating the monitored tipping moment severity with the appropriate zone of criticality factor;

computing the absolute value of the monitored tipping moment severity;

computing a weighted tipping moment severity value using the absolute value of the monitored tipping moment severity, the tipping moment severity factor and the zone of criticality factor associated with the monitored tipping moment severity;

recording weighted tipping moment severity values versus time; and generating a cumulative tipping moment severity value for one slide stroke using the weighted tipping moment values versus time.

23. An apparatus for monitoring the die reliability condition of a running press, the running press having a bed, said apparatus comprising:

at least one load sensor for sensing a load value, said at least one load sensor attached to the bed of the running press;

a computational device for computing a plurality of computed values, said device storing a plurality of data relating to the running press and receiving the load value from said at least one load sensor, wherein one of said plurality of computed values is a measure of the tipping moment severity of the running press based on said sensed load value from said at least one load sensor, said computational device communicatively connected to said at least one load sensor; and a data plotting device communicatively connected to said computational device, said data plotting device configured for graphically charting said measure of the tipping moment severity.

24. A method of monitoring the die reliability condition of a running press, the running press having a bed, said method comprising:

monitoring the tipping moment severity of the running press;

generating at least one tipping moment severity value as a result of said step of monitoring; and plotting each said tipping moment severity value graphically.

25. The method of claim 24, wherein said step of monitoring the tipping moment severity of the press comprises:

placing at least one load sensor on the bed of the running press;

providing a computational device; and communicating the load sensed by the load sensor to the computational device; and said step of generating at least one tipping moment severity value comprising:

computing one said tipping moment severity value using the sensed load value.

* * * * *